US012573893B2

(12) United States Patent
 Fuchs et al.

(10) Patent No.: US 12,573,893 B2
(45) Date of Patent: Mar. 10, 2026

(54) ROTOR WITH PLASTIC HUB

(71) Applicant: MAGNA Auteca GmbH, Weiz (AT)

(72) Inventors: Reinhard Fuchs, Pischelsdorf (AT);
Hubert Schlager, Puch bei Weiz (AT)

(73) Assignee: MAGNA Auteca GmbH, Weiz (AT)

( * ) Notice: Subject to any disclaimer, the term of this
patent is extended or adjusted under 35
U.S.C. 154(b) by 188 days.

(21) Appl. No.: 18/424,805

(22) Filed: Jan. 28, 2024

(65) Prior Publication Data

US 2024/0313594 A1     Sep. 19, 2024

(30) Foreign Application Priority Data

Mar. 17, 2023     (EP) ..................................... 23162589

(51) Int. Cl.
H02K 1/2706         (2022.01)
(52) U.S. Cl.
CPC ................................... H02K 1/2706 (2013.01)
(58) Field of Classification Search
CPC .. H02K 1/2706; H02K 1/2733; H02K 5/1677;
H02K 7/086; H02K 7/116
See application file for complete search history.

(56) References Cited

U.S. PATENT DOCUMENTS 10,693,341 B1 *  6/2020  McAuley ............... H02K 7/116

FOREIGN PATENT DOCUMENTS

| DE | 102017103936 A1 * | 8/2018 | ............... H02K 5/16 |
| DE | 102013105964 A1 | 12/2021 | |
| DE | 102020122164 A1 | 3/2022 | |
| EP | 1322023 A1 | 6/2003 | |

OTHER PUBLICATIONS

European Search Report for EP 23162589.8 dated Sep. 5, 2023.

* cited by examiner

*Primary Examiner* — Christopher M Koehler
*Assistant Examiner* — Ethan Nguyen Vo
(74) *Attorney, Agent, or Firm* — Jordan IP Law, LLC;
Todd A. Vaughn

(57)         ABSTRACT

A rotor for an electric motor includes a hub, formed of a
plastic material, having a bore and a resilient hub finger; a
magnetic ring rotationally connected to the hub; and a fixed
axle arranged in the bore for receipt of a radial force applied
by the resilient hub finger to facilitate rotation of the hub
about the fixed axle.

17 Claims, 2 Drawing Sheets

ROTOR WITH PLASTIC HUB

CROSS-REFERENCE TO RELATED APPLICATIONS

The present application claims priority under 35 U.S.C. § 119 to European Patent Publication No. EP 23162589.8 (filed on Mar. 17, 2023), which is hereby incorporated by reference in its complete entirety.

TECHNICAL FIELD

One or more embodiments of the present disclosure relates to a rotor for an electric motor and a small actuator for a motor vehicle, the small actuator having an electrically commutated electric motor having such a rotor.

BACKGROUND

In some electrically commutated small actuators, rotors which are directly integrated in a gear mechanism are used. The rotor rotates in the stator about a fixed axle and a tooth arrangement which is integrated in the rotor hub acts as a driven pinion of the gear mechanism. For reasons of cost, it is advantageous for the hub to be produced from plastics material, preferably in an injection-moulding operation. In this instance, it is necessary to pay special attention to the bearing play between the rotor bore and axle: should the bearing play be too small in size, as a result of the relatively large thermal expansion coefficients of plastics materials, shrinkage may occur at a low temperature, with an excessively large bearing play in turn there may be produced an upward swing of the rotor which results in disruptive noise. In some cases, the tolerance range for the permissible bearing play is so small that this cannot be produced in an operationally reliable manner.

German Patent Publication DE 10 2013 105 964 A1 describes a rotor having an additional bearing bush which is pressed into the hub or is overmolded by the hub. As a result of the selection of the production process or the selection of the material of the bush, a corresponding bearing play can be maintained. As a result of the additional component, however, additional production complexities and costs arise.

SUMMARY

One or more embodiments of the present disclosure are to provide a rotor for an electric motor which, on the one hand, avoids shrinkage at low temperatures and which, on the other hand, avoids upward pivoting of the rotor and consequently disruptive noises and can be produced in an operationally reliable and cost-effective manner. Another object of the invention is to provide a small actuator having an electric motor with such an advantageous rotor.

In accordance with one or more embodiments, a rotor for an electric motor comprises: a hub, formed of a plastic material, having a bore and a resilient hub finger; a magnetic ring rotationally connected to the hub in a secure manner; and a fixed axle arranged in the bore for receipt of a radial force applied by the resilient hub finger to facilitate rotation of the hub about the fixed axle.

In accordance with one or more embodiments, the hub of the rotor is itself configured in such a manner that a portion (i.e., the resilient hub finger) of the hub presses as a resilient continuation/hub finger against the fixed axle, and consequently impedes the movement between the hub and axle. As a result of the resilience of the hub material or the geometric configuration as a continuation/hub finger, however, there is no shrinkage of the rotor on the axle since it can be deflected. The advantage of such an embodiment is that the rotor bore can be produced with a relatively large tolerance range in an operationally reliable manner without additional production complexity and costs.

In accordance with one or more embodiments, it is preferable the continuation/hub finger extends substantially parallel with the axle.

In accordance with one or more embodiments, it is preferable precisely one portion of the hub is in the form of a resilient continuation so that only a resilient continuation/hub finger applies a radial force to the axle which is arranged in the bore. Only a "finger" presses to some degree on the axle. The continuation/hub finger preferably has a radially internal projection, in particular a convex formation, so that the projection bears on the axle.

In accordance with one or more embodiments, it is preferable the continuation/hub finger is formed in an axial end region of the hub and the continuation faces towards an axial end of the hub which terminates the axial end region.

The magnetic ring is preferably arranged radially outside the continuation/hub finger and axially covers the continuation/hub finger at least partially, preferably completely.

In accordance with one or more embodiments, it is preferable a portion of the hub is in the form of a bearing shell for the axle. In addition to the continuation/hub finger/hub finger which presses on the axle, there is thus another portion of the hub in which the axle is positioned.

In accordance with one or more embodiments, it is preferable the bearing shell at least partially axially covers the continuation/hub finger, in a particularly preferred manner it covers the continuation/hub finger completely. The bearing shell can thus partially or completely use the same axial structural space in which the continuation/hub finger is also formed. An enhanced bearing for the axle is thereby enabled as a result of a longer bearing shell in the same structural space.

In accordance with one or more embodiments, it is preferable the bearing shell forms a circle segment which covers between 180 degrees and 350 degrees of a circle, preferably between 185 degrees and 270 degrees.

In accordance with one or more embodiments, it is preferable the bearing shell is formed with substantially the same radial spacing with respect to the centre of the axle as the continuation/hub finger so that the continuation/hub finger and the bearing shell form circle segments of the same circle. In this instance, the radial spacing of the continuation/hub finger from the centre of the bore of the hub is slightly less than the radial spacing of the bearing shell from the centre of the bore since the continuation/hub finger is pretensioned against the axle and presses the axle against the bearing shell.

In accordance with one or more embodiments, it is preferable the continuation/hub finger is separated in a circumferential direction from the lateral edges of the bearing shell via gaps or slots.

In accordance with one or more embodiments, it is preferable in an axial portion, that is to say, a toothed region of the hub, a tooth arrangement is formed on the hub. The toothed region preferably does not intersect with the axial region of the continuation/hub finger.

In accordance with one or more embodiments, a small actuator for a motor vehicle comprises an electrically commutated electric motor having a rotor that itself a hub, formed of a plastic material, having a bore and a resilient hub finger; a magnetic ring rotationally connected to the hub in a secure manner; and a fixed axle arranged in the bore for receipt of a radial force applied by the resilient hub finger to facilitate rotation of the hub can about the fixed axle. In this instance, a fixed stator of the electric motor is preferably arranged radially externally around the magnetic ring of the rotor.

BRIEF DESCRIPTION OF DRAWINGS

The one or more embodiments of this disclosure will be illustrated by way of example in the drawings and explained in the description hereinbelow.

DESCRIPTION

Figure 1:
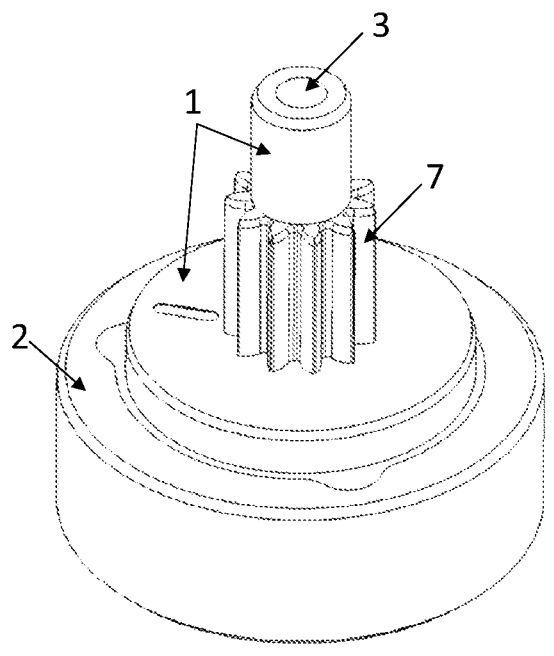
FIG. 1 shows a three-dimensional top view of a rotor, in accordance with one or more embodiments.

FIG. 1 shows an oblique top view of a rotor in accordance with one or more embodiments. It is possible to see the hub 1 is formed of a plastic material with an integrated tooth arrangement 7 and the magnetic ring 2 which is connected to the hub 1.

Figure 2:
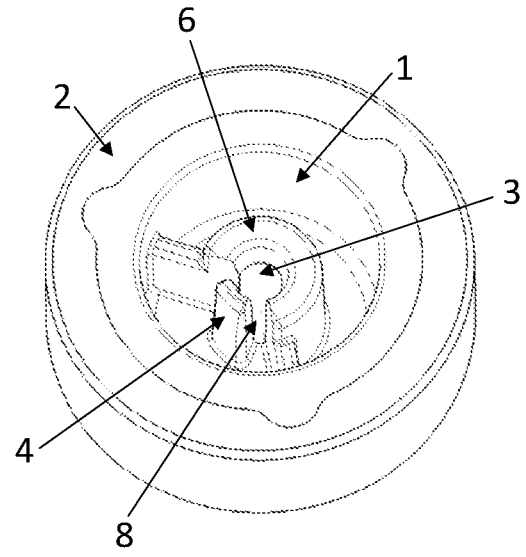
FIG. 2 shows a three-dimensional bottom view of the rotor of FIG. 1.

FIG. 2 shows an oblique bottom view of the rotor of FIG. 1. The hub 1 is, at the side facing away from the tooth arrangement 7, divided by slots 8. A side of a circular formation of the hub 1 thereby forms a fixed bearing shell 6 around the central bore 3 and at the opposing side of the circular formation, in another circumferential region, a finger-like continuation/hub finger 4 is produced. As a result of the geometric configuration of the continuation/hub finger 4, it is much more flexible compared with the bearing shell 6 and can be deflected under the action of pressure.

FIGS. 1 and 2 consequently show a rotor for an electric motor, comprising a hub 1 formed of a plastic material and which has a bore 3, a magnetic ring 2 which is connected to the hub 1 in a rotationally secure manner, a fixed axle (not illustrated) arranged in the bore 3 so that the hub 1 can rotate about the fixed axle.

In accordance with one or more embodiments, a portion of the hub 1 itself, i.e., integrally with respect to the hub 1, comprises a resilient continuation/hub finger 4 which applies a radial force to the fixed axle which is arranged in the bore 3. The continuation/hub finger 4 extends substantially parallel with the axle 3 and forms a boundary of the bore 3.

Figures 3, 4, 5:
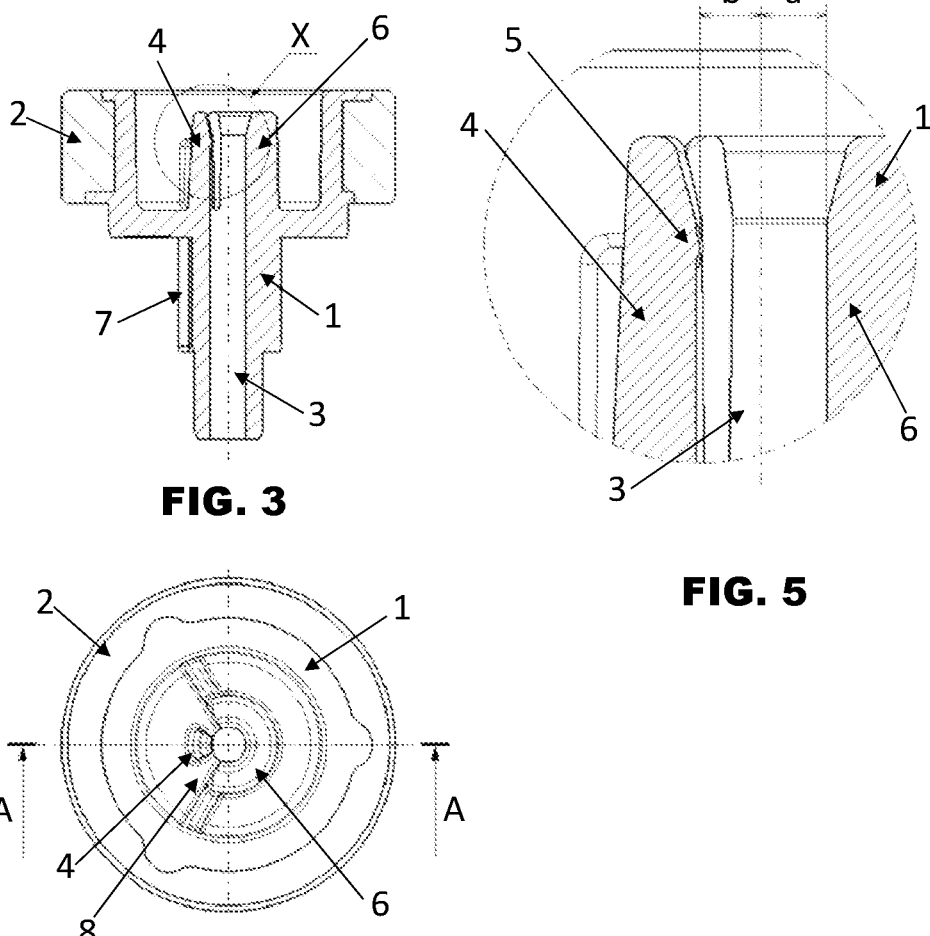
FIG. 3 shows a lateral sectional view of the rotor of FIG. 1 through the continuation/hub finger, according to the section A-A of FIG. 4.
FIG. 4 shows a bottom view of the rotor of FIG. 1 with the position of the section A-A.
FIG. 5 shows a detailed illustration of the detail X of FIG. 3.

As can also be seen in FIG. 3, the continuation/hub finger 4 is formed in an axial end region of the hub 1 and faces in the direction towards an axial end of the hub 1 which terminates this axial end region.

The magnetic ring 2 is arranged radially outside the continuation/hub finger 4 and axially completely covers the continuation/hub finger 4.

As can be clearly seen in FIGS. 2 and 3, a portion of the hub 1 is in the form of a bearing shell 6 for the fixed axle. The bearing shell 6 is in this axial end region constructed to be of the same axial length as the continuation/hub finger 4, and therefore covers the continuation/hub finger 4 completely. The bearing shell 6 is formed substantially with the same radial spacing with respect to the centre of the axle as the continuation/hub finger 4 so that the continuation/hub finger 4 and the bearing shell 6 form circle segments of the same circle which are separated from each other by slots 8. The bearing shell 6 forms a circle segment which occupies approximately 250 degrees. The continuation/hub finger 4 forms a circle segment. This circle segment may occupy approximately from 10 to 40 degrees, in this instance approximately 15 degrees.

In an axial toothed region of the hub 1, a tooth arrangement 7 is formed on the hub 1, wherein the toothed region does not intersect with the axial region of the continuation/hub finger 4.

In the illustrated embodiment (see FIG. 3), the hub 1 has a cup-shaped formation on which the magnetic ring 2 is arranged radially externally and in which at the radially inner side the bearing shell 6 and the continuation/hub finger 4 are arranged. The base of this cup merges at the other axial end at which the continuation/hub finger 4 is not formed into a sleeve which continues the bearing shell 6 and which completely delimits the bore 3 circumferentially.

In the detailed view of FIG. 5, a projection 5 can be seen at the inner side of the continuation/hub finger 4 and forms the region which is in contact with the axle. The spacing "b" is configured to be less than the spacing "a" so that, when the rotor is pushed onto the axle, the continuation/hub finger 4 presses on the fixed axle with a small pre-tensioning. The radial spacing of the continuation/hub finger 4 from the centre of the bore 3 of the hub 1 is therefore slightly less than the radial spacing of the bearing shell 6 from the centre of the bore 3 so that the continuation/hub finger 4 is pretensioned against the fixed axle.

LIST OF REFERENCE SYMBOLS

1 Hub
2 Magnetic ring
3 Bore
4 Continuation/hub finger
5 Projection
6 Bearing shell
7 Tooth arrangement
8 Slot
a Spacing
b Spacing

What is claimed is:

1. A rotor for an electric motor, the rotor comprising:
   a hub, formed of a plastic material, having a bore and a resilient hub finger;
   a magnetic ring rotationally connected to the hub; and
   a fixed axle arranged in the bore for receipt of a radial force applied by the resilient hub finger to facilitate rotation of the hub about the fixed axle,
   wherein:
      a portion of the hub is in the form of a bearing shell for the fixed axle, the bearing shell at least partially axially covering the resilient hub finger, and
      the bearing shell is formed with substantially a same radial spacing with-respect to a center of the fixed axle as the resilient hub finger so that the resilient hub finger and the bearing shell form circle segments of a same circle.

2. The rotor of claim 1, wherein the resilient hub finger extends substantially parallel with the fixed axle.

3. The rotor of claim 1, wherein the resilient hub finger is formed at one region of the hub to apply the radial force to the fixed axle.

4. The rotor of claim 1, wherein the resilient hub finger has a radially internal projection that engages the fixed axle.

5. The rotor of claim 1, wherein the resilient hub finger is formed in an axial end region of the hub to face towards an axial end of the hub which terminates the axial end region.

6. The rotor of claim 1, wherein the magnetic ring is arranged radially outside the resilient hub finger to at least partially axially cover the resilient hub finger.

7. The rotor of claim 1, wherein the bearing shell forms a circle segment which covers between 185 degrees and 270 degrees.

8. The rotor of claim 1, wherein the radial spacing of the resilient hub finger from the center of the bore of the hub is slightly less than the radial spacing of the bearing shell from the centre of the bore so that the continuation/hub finger is pretensioned against the axle.

9. The rotor of claim 1, further comprising a tooth arrangement is formed on the hub in an axial toothed region of the hub, the toothed region arranged to not intersect an axial region of the resilient hub finger.

10. An actuator for a motor vehicle, the actuator comprising:

an electrically commutated electric motor that includes a rotor having:

a hub, formed of a plastic material, having a bore and a resilient hub finger;

a magnetic ring rotationally connected to the hub; and a fixed axle arranged in the bore for receipt of a radial force applied by the resilient hub finger to facilitate rotation of the hub about the fixed axle, wherein:

a bearing shell at least partially axially covers the resilient hub finger, the bearing shell is formed with substantially a same radial spacing with respect to a center of the fixed axle as the resilient hub finger so that the resilient hub finger and the bearing shell form circle segments of a same circle, and the radial spacing of the resilient hub finger from the center of the bore of the hub is slightly less than the radial spacing of the bearing shell from the centre of the bore so that the resilient hub finger is pretensioned against the axle.

11. The actuator of claim 10, electrically commutated electric motor further includes a fixed stator arranged radially externally around the magnetic ring.

12. The actuator of claim 10, wherein the resilient hub finger extends substantially parallel with the fixed axle.

13. The actuator of claim 10, wherein the resilient hub finger has a radially internal projection that engages the fixed axle.

14. The actuator of claim 10, wherein the magnetic ring is arranged radially outside the resilient hub finger to at least partially axially cover the resilient hub finger.

15. The actuator of claim 10, wherein the bearing shell forms a portion of the hub for the fixed axle.

16. The actuator of claim 10, further comprising a tooth arrangement is formed on the hub in an axial toothed region of the hub, the toothed region arranged to not intersect an axial region of the resilient hub finger.

17. A rotor for an electric motor, the rotor comprising:

a hub, formed of a plastic material, having a bore and a resilient hub finger that forms a boundary of the bore and terminates an axial end region of the hub;

a magnetic ring rotationally connected to the hub; and a fixed axle arranged in the bore for receipt of a radial force applied by the resilient hub finger to facilitate rotation of the hub about the fixed axle, wherein:

a portion of the hub is in the form of a bearing shell that at least partially axially covers the resilient hub finger, and the bearing shell is formed with substantially a same radial spacing with respect to a center of the fixed axle as the resilient hub finger so that the resilient hub finger and the bearing shell form circle segments of a same circle.

* * * * *